(12) United States Patent
Khan et al.

(10) Patent No.: US 7,381,348 B2
(45) Date of Patent: Jun. 3, 2008

(54) OPTICAL DEVICE

(75) Inventors: Ir Gvon Khan, Dolgoprudny (RU); Sergej Vasilievich Belyaev, Dolgoprudny (RU); Georgy Nikolaevich Vorozhtsov, Moscow (RU); Maria Leonardovna Kukushkina, Moscow (RU); Nikolai Vladimirovich Malimonenko, Lobnya (RU); Nataliya Nikolaevna Masanova, Moscow (RU); Elena Yurievna Shishkina, Moscow (RU); Olga Akhmatovna Tambieva, Dolgoprudny (RU)

(73) Assignee: IR Gvon Khan, Dolgoprudny (RU)

( * ) Notice: Subject to any disclaimer, the term of this patent is extended or adjusted under 35 U.S.C. 154(b) by 336 days.

(21) Appl. No.: 10/479,447

(22) PCT Filed: Jun. 3, 2002

(86) PCT No.: PCT/RU02/00270

§ 371 (c)(1),
(2), (4) Date: May 24, 2004

(87) PCT Pub. No.: WO02/099480

PCT Pub. Date: Dec. 12, 2002

(65) Prior Publication Data

US 2004/0232394 A1 Nov. 25, 2004

(30) Foreign Application Priority Data

Jun. 4, 2001 (RU) ............................ 2001114924

(51) Int. Cl.
*C09K 19/52* (2006.01)
*C09K 19/00* (2006.01)
*C09K 19/02* (2006.01)

(52) U.S. Cl. .................. 252/299.01; 428/1.1; 428/1.3; 428/1.2; 349/182; 430/20

(58) Field of Classification Search ........... 252/299.01; 430/20; 349/182; 428/1.1–1.3
See application file for complete search history.

(56) References Cited

U.S. PATENT DOCUMENTS

| | | | |
|---|---|---|---|
| 4,803,014 A | 2/1989 | Okumura et al. ............ 252/585 |
| 5,007,942 A | 4/1991 | Claussen et al. ............... 8/506 |
| 5,318,856 A | 6/1994 | Misawa et al. ............. 428/524 |
| 5,340,504 A | 8/1994 | Claussen ..................... 252/585 |
| 5,739,296 A | 4/1998 | Gvon et al. ................. 534/577 |
| 5,751,389 A | 5/1998 | Andreatta et al. ............ 349/97 |
| 6,399,166 B1 * | 6/2002 | Khan et al. ................. 428/1.31 |
| 2003/0089956 A1 * | 5/2003 | Allen et al. .................. 257/432 |
| 2003/0090012 A1 * | 5/2003 | Allen et al. ................. 264/1.31 |

FOREIGN PATENT DOCUMENTS

| | | |
|---|---|---|
| EP | 0 626 598 | 11/1994 |
| EP | 0 530 106 | 12/1996 |
| EP | 0 969 296 | 1/2000 |
| RU | 2 110 822 | 5/1995 |
| RU | 2152634 | 7/2000 |
| WO | WO 99/31535 | 6/1999 |
| WO | WO 00/67069 | 11/2000 |

OTHER PUBLICATIONS

L. K. Vistin, GVHO, 1983, vol. XXVII, 2, pp. 141-148 ISSN 0373-0247.
L. N. Nikolenko: *Labor Practicum of Intermediates and Dyes*, Moscow, 1961, pp. 172-175, 212-225, 234-241 & 312-315.
N. Venkataraman: *The Chemistry of Organic Dyes*, Leningrad, 1956 pp. 558-579, 612-612-619, 648-652, 701,703, 714-721, 1316-1323, 1332-1333, 1342-1343, 1360-1361.
Khan, Ir G. et al., "Ultra-Thin O-Polarizers' Superiority over E-Polarizers for LCDs", SID 04 Digest, pp. 1316-1319, 2004.
Bobrov, Yuri et al., "Lyotropic Thin Film Polarizers", SID 00 Digest, pp. 1102-1105, 2000.
Bobrov, Y, et al., "The Manufacutre of a Thin-Film LCD", Journal of the SID Oct. 4, 2002, pp. 317-321, 2002.
Belyaev, S.V. et al., "O- and E-polarizers and Advanced Optical Films for LCDs Based on Lyotropic Dichroic Dyes", Advanced Materials R&D, LG Chemical Ltd. Research Park, pp. 1-4, 2002.
Lazarev, P et al., "X-ray Diffraction By Large Area Organic Crystalline Nano-Films", Mol Materials 2001, vol. 14, pp. 303-311, 2001.
Paukshto, Michael V., "E-type Polarizers and Their Applications", SID Bay Area Chapter Seminar, Oct. 9, 2001, 34 pages.

* cited by examiner

*Primary Examiner*—Geraldina Visconti
(74) *Attorney, Agent, or Firm*—Kenyon & Kenyon LLP

(57) ABSTRACT

The invention relates to optical devices for producing and/or transforming polarized electromagnetic emission by means of anisotropic absorption and/or optical rotation effects and/or birefringence and can be used as different polarizers (dichroic, reflecting), lagging layers (retarders), liquid-crystal displays and indicators and also for producing polarizing glass for building construction and for sun and antiglare glasses, masks, aprons and faceplates. The inventive optical device is based on at least one molecularly oriented layer of a low-molecular or oligomeric dichroic material which can form a stable lyotropic liquid crystal structure. The projection of at least one anisotropically absorbing fragment of a molecule of the dichroic material on the surface of the molecularly oriented layer of a dipole moment of optical transition is disposed in a parallel position to the optical axis of the molecularly oriented layer at least within several ranges of wavelength of the electromagnetic emission.

27 Claims, No Drawings

OPTICAL DEVICE

This is a 371 of PCT/RU02/00270 filed 3 Jun. 2002, which claims priority to RU 2001114924 filed 4 Jun. 2001, the contents of which are incorporated herein by reference.

FIELD OF THE INVENTION

The present invention relates to the field of optics, namely to optical devices for creation and/or transformation of polarized electromagnetic radiation due to effects of anisotropic absorption and/or optical rotation and/or birefringence effect.

The present optical device can be used as polarizers of various types (dichroic, reflective), phase delay layers or coatings (retarders), liquid crystal displays (LCD) and indicators, information display devices, in production of optical instruments, in manufacturing of polarization glass for building construction, in lighting equipment, and also for fabrication of sun-protection and antiglare glasses, masks, shields, visors, polarization pictures, advertising, security facilities of trademarks or securities.

DESCRIPTION OF THE RELATED ART

At the present time for conversion of unpolarized electromagnetic radiation (for example visible light) into polarized one optical devices are widely used consisting of dichroic polarizer which operating principle is based on transmission of one polarization component and absorption of the other.

The most presently used dichroic polarizers are made of stretched polymeric films, formed preferably from polyvinyl alcohol (PVA), dyed with iodine compounds or organic dyes (see, e.g., U.S. Pat. No. 5,340,504).

Anisotropic absorption of electromagnetic radiation in said dichroic polarizers is provided with dichroic chromophores of dyes or complexes of PVA-iodine, oriented with long axes along stretching direction and, therefore, parallel to the optical axis of the dichroic polarizer.

PVA-based iodine dye polarizers have high polarization performance and are widely used in LCD manufacturing for displays, watches, calculators, monitors, notebooks, etc.

Uncolored uniaxially stretched polymeric films based on PVA are used as phase delay layers, films or wave plates (retarders).

The optical devices, which are named phase delay layers or retarders (this name we will use further for brief), are presently used to increase contrast and to widen viewing angles of LCD, and in other polarization optical devices (polarimeters, fiberoptics, etc.). Values of retarder's parameters differ depending on the purpose of the devices.

Base retarders parameters are: retardation R of the wave plate (film or coating) in the normal direction, wavelength dependence of R and angle of incidence dependence of R. Retardation can be expressed as $R=\Delta n \cdot d$, where $\Delta n$—birefringence ($\Delta n = n_e - n_o$) in the normal direction, d—thickness of the retarder layer.

The most known retarders are: a quarter-wave plate (when $R=\lambda/4$, where $\lambda$—wavelength, e.g. 500 nanometers (nm)), designed to convert linear polarized light into circular polarized one and vice versa; a half-wave plate (when $R=\lambda/2$) designed to rotate polarized light plane on 180. At the present time retarders used in LCD are based on stretched polymer uncolored films of PVA or polycarbonate (PC) with retardation R from 20 to 1000 nm.

All retarders have anisotropic absorption of light at least at shorter wavelengths, than the operating wavelengths range. Some of used retarders have different dependence of retardation when inclined at different azimuth, for example, due to asymmetric (inclined) location of molecular directors and, therefore, their chromophores.

The known dichroic polarizers and retarders have, however, a number of disadvantages—high cost and low thermostability (~80° C.), multilayer structure and high thickness (up to 200 micrometers (µm)), that results in ghosting of the image, decreasing of viewing angles and decreasing of physical-mechanical properties of the optical devices for video information display systems and, namely, LCD in form of a flat cuvette provided with two parallel glass plates with optically transparent electrodes of, e.g., tin dioxide coated on the glass plates internal surfaces. The plate surfaces having electrodes are subjected to treatment providing required homogeneous orientation of liquid crystals (LC) molecules near the plates surface and in the bulk of the LC film. In homogeneous orientation the long axes of LC molecules are positioned in parallel to the orientation directions, which are usually selected as mutually orthogonal. After cuvette assembly it is filled with LC forming a 5-20 µm thickness layer, being an active medium and changing the optical properties (plane of polarization rotation angle) under action of electric field. Change of optical properties is registered in crossed polarizers attached to the outer surfaces of the cuvette (see, e.g. L. K. Vistin, GVHO, 1983, volume XXVII, 2, pp. 141-148). In this case display regions without voltage applied to the electrodes thereof transfer light and look bright and display regions without voltage look dark. To improve the angular performances the LCD can comprise additional elements—retarders. To obtain color image LCD should include an additional special layer, colored with dyes and formed as some picture element (symbol and game screens) or as a color filter matrix of RGB or CMY type (matrix screens) providing colored light in accordance with the color filter element.

It is known an optical device—polarizer, comprising a film, containing at least 1 weight percent of oriented dichroic dye, which is formed by applying a film-forming material on a fluoroplastic orienting layer (see U.S. Pat. No. 5,751,389).

Said polarizer has small thickness (from 1 nm to 5 µm) and high polarization performance (dichroic ratio at maximum absorption region is not less than 25).

The main disadvantages of said device and LCD on its basis (U.S. Pat. No. 5,751,389) are restricted polarizer size (2.5×8 cm$^2$) and high cost due to technological complexity, therefore it is difficult to realize mass production thereof, because of necessity to use deep vacuum to form oriented film with dyes, and high temperature (up to 300° C.) and pressure to form fluoroplastic orienting layer.

The most close on the technical matter is an optical device—dichroic polarizer, comprising a substrate with polarizing coating, including a thin (0.1-1.5 µm) molecular oriented layer, formed of plurality of supra-molecular complexes of organic dyestuffs of general formula {Chromogen}$(SO_3M)_n$, wherein M—$H^+$, $Li^+$, $Na^+$, $K^+$, $Cs^+$, $NH_4^+$, Chromogen—chromophore system of dye, capable to form stable lyotropic liquid crystal phase (see U.S. Pat. No. 5,739,296). Thus the molecular oriented layer is obtained by deposition of stable lyotropic liquid crystal (LLC) composition based on said organic dyes on the substrate surface by simultaneous applying of a shear force with subsequent removing of solvent.

Polarizing coating (PC) provides high thermostability (200-300° C.) for said device and small thickness thereof allows to use the PC based device as inner polarizers for manufacturing of wide view angles LCD and LC indicators.

An essential disadvantage of said dichroic polarizer and LCD based thereon is relatively poor polarization performance, which prevents to use it in information display devices with high resolution.

Hence, for the above dichroic polarizer dichroic ratio $K_d=D_\perp/D_{II}$, in best case is equal 25-30, which is much lower, than for a PVA based polarizer having $K_d=60-80$ ($D_\perp$—optical density, when orientation of the plane of polarization for measured polarizer is perpendicular to the plane of polarization for polarized light, $D_{II}$—optical density, when orientation of the plane of polarization for the measured polarizer is parallel to the plane of polarization for polarized light).

The cause of low dichroic ratio of PC dichroic polarizer (U.S. Pat. No. 5,739,296) is the fact, that orientation of the plane of dye molecules and chromophores is perpendicular to the optical axis. That is, in contrast to iodine polarizers which are polarizers of positive type, the device according to the aforementioned U.S. Pat. No. 5,739,296 relates to dichroic polarizer of negative type.

The negative polarizers provide good angular LCD performance, but have poor polarization performance, in particular, low dichroic ratio (approximately 2 times lower, than for positive polarizers) that does not provide LCD with high resolution and contrast.

SUMMARY OF THE INVENTION

The object of the present invention is an optical device (polarizer, retarder, LCD, indicator or other devices) providing more efficient creation (forming) and/or transformation of polarized electromagnetic radiation with high thermostability, lightfastness and small thickness, and also ensuring technological simplicity.

This object is achieved with help of an optical device comprising at least one molecular oriented layer of low-molecular weight or oligomeric dichroic material capable to form a stable lyotropic liquid crystal (LLC) phase, wherein projection of optical transition dipole moment of at least one anisotropically absorbing fragment of dichroic material molecule on the molecular oriented layer plane is preferably parallel to an optical axis of the molecular oriented layer, having dichroic ratio not less than 35 at least in a certain wavelengths range of electromagnetic radiation.

The term "dichroic material" means a substance capable of anisotropic absorption of electromagnetic radiation at least in some wavelengths range.

The term "light" means electromagnetic radiation of visible, near ultraviolet (UV) and near infrared (IR) wavelengths range, i.e. in a range from 250-300 nm up 13 μm.

The term "dye" means a substance capable to intensively absorb and to transform electromagnetic radiation of the visible, near ultraviolet and near infrared wavelengths range.

The term "optical axis" of molecular oriented layer means an optically selected direction in the layer plane. In our cases the optical axis coincides with the coating direction.

A distinctive feature of the present invention is use of molecular oriented layer of dichroic material, containing at least one anisotropic absorbing fragment, for which projection of optical transition dipole moment on the molecular oriented layer plane is essentially parallel to the optical axis of the molecular oriented layer, as in the case of iodine polarizer based on PVA, at least in a certain wavelengths range of electromagnetic radiation.

In a more preferable embodiment the invention provides an optical device, wherein optical transition dipole moment of at least one anisotropic absorbing fragment of the dichroic material molecule is substantially parallel to the optical axis of the molecular oriented layer.

This feature of the claimed optical device provides the greatest polarization efficiency and/or transformation of electromagnetic radiation in comparison with the known art—a polarizer of negative type, wherein the optical transition dipole moment for dye molecules is directed both along the polarizer plane and on an arbitrary angle in relation to the plane of negative polarizer.

Hence, the usage of said molecular oriented layer of the dichroic material based on dyes allows to fabricate thermo-stable ultra-thin dichroic polarizers with dichroic ratio not less than 35, and in some cases up to 100, that much more exceeds parameters of the known art device and is comparable with parameters of the best iodine polarizers.

Application of the above molecular oriented layer of dichroic material also allows to provide an optical device—LCD having high resolution (contrast), enhanced luminance and improved color brilliance—comprising a liquid crystal layer placed between two plates, at least one of which having electrodes and optical devices for creation and/or transformation of polarized electromagnetic radiation, for example, polarizers, comprising at least one molecular oriented layer of low molecular weight or oligomeric dichroic material, capable to form stable LLC phase, wherein projection of optical transition dipole moment on said layer plane for at least one anisotropically absorbing fragment of dichroic material molecule is substantially parallel to the optical axis of the molecular oriented layer at least in some wavelengths range of electromagnetic radiation. The polarizer can be placed both on the interior and on the exterior sides of the LCD plates. Combination of the interior and the exterior positions of the above polarizers is also possible.

It is possible an embodiment of the optical device—LCD further comprising molecular oriented layers of a dichroic material having no absorption in the visible spectrum wavelengths range of a light, comprising at least one molecular oriented layer of a dichroic material containing at least one anisotropic absorbing fragment, for which a projection of optical transition dipole moment on said layer plane for at least one anisotropic absorbing fragment of a dichroic material molecule is essentially parallel or perpendicular to the optical axis of the molecular oriented layer at least in some wavelengths range of electromagnetic radiation.

The above molecular oriented layers of the dichroic material having no absorption in visible spectrum wavelengths range, can be used as a retarder in LCD.

Another embodiment of the claimed optical device is LCD comprising a combination of negative and positive type polarizers with both exterior and interior disposition of molecular oriented layer. Such combination ensures possibility of production of shadow-free LCD with wide viewing angles. It is also possible to use the claimed optical device (both as a polarizer and as a retarder) in combination with conventional polarizers based on PVA dyed with iodine compounds and/or with dichroic dyes.

At the internal disposition the proposed polarizer and/or retarder can be used simultaneously as an alignment layer for LC that simplifies LCD production process.

To provide parallelism of optical transition dipole moment and optical axis for molecular oriented layer it is preferable to use dichroic material, molecules of which or at least one anisotropically absorbing fragment of a molecule have a linear structure.

Capability of the dichroic material to form stable LLC phase allows to realize a method of orientation of LLC composition based on mechanical ordering, which can be realized by known methods (see U.S. Pat. No. 5,739,296) imposing shearing force or under wedging forces arising at separation of one surface from another, between which an LLC layer is distributed.

A stable LLC phase can be formed both on the basis of single molecules and/or of molecular associates (complexes) of a dichroic material with low degree of aggregation, and on the basis of supramolecular complexes of the dichroic material.

Manufacturing of the optical device—a dichroic polarizer—requires to use a dichroic material based on the dye wherein at least one anisotropically absorbing fragment has absorbance in the visible spectral wavelengths region (400-700 nm).

Using of dichroic material without absorbance in the visible spectral wavelengths region provides an optical device which can be used as thermostable ultra-thin retarders.

For manufacturing of the claimed optical device at least one molecular oriented layer of dichroic material is formed on the basis of:

at least one salt of dichroic anionic dye having general formula (I): $\{Chromogen\}(-X_iO^-M_i^+)_n$, where Chromogen is hereinbelow a dye chromophore system; $X_i$ (hereinbelow)=CO, $SO_2$, $OSO_2$, $OP(O^-M^+)$; n=1-20, $M_i^+$ (hereinbelow)=$H^+$ and/or $M_H^+$ and/or $MO^+$, wherein $M_H^+$ represents (hereinbelow) an inorganic cation, for example, of the following type $NH_4^+$, $Li^+$, $Na^+$, $K^+$, $Cs^+$, $\frac{1}{2}Mg^{++}$, $\frac{1}{2}Ca^{++}$, $\frac{1}{2}Ba^{++}$, $\frac{1}{3}Fe^{+++}$, $\frac{1}{2}Ni^{++}$, $\frac{1}{2}Co^{++}$ etc., $M_o^+$ represents (hereinbelow) an organic cation, for example, of the following type N-alkylpyridinium, N-alkylchinolinium, N-alkylimidazolinium, N-alkylthiazolinium etc., $OH-(CH_2-CH_2O)_m-CH_2CH_2-NH_3^+$ where m=1-9, $RR'NH_2^+$, $RR'R''NH^+$, $RR'R''R*N^+$, $RR'R''R*P^+$ where R, R', R'', R*=alkyl or substituted alkyl of the type $CH_3$, $HOC_2H_4$, $C_2H_5$, $C_3H_7$, $C_4H_9$, $C_6H_5CH_2$, substituted or unsubstituted phenyl or heteroaryl; $YH-(CH_2-CH_2Y)_k-CH_2CH_2$, Y=O or NH, k=0-10;

and/or at least one associate of a dichroic anionic dye with surface-active cation and/or amphoteric surfactant of general formula (II): $(M_i^+O^-X_i-)_n\{Chromogen\}(-X_jO-SAI_j)_m$, where $X_j$ (hereinbelow)=CO, $SO_2$, $OSO_2$, $OP(O^-M^+)$; n=0-19, m=1-4; $M_i^+$=$H^+$ and/or $M_o^+$ and/or $M_H^+$; $SAI_j$ (hereinbelow surface-active ion)=$SAC^+$ and/or AMSAS, where $SAC^+$ hereinbelow—a surface-active cation, AMSAS here and further is an amphoteric surface-active substance;

and/or at least one associate of a dichroic cationic dye with surface-active anion and/or amphoteric surfactant of general formula (III): $(M_i^+O^-X_i-)_n\{Chromogen^+\}SAI$, where n=0-5, SAI=$SAA^-$ and/or AmSAS, where SAA—hereinbelow is a surface-active anion;

and/or at least one associate of a dichroic cationic dye with surface-active anion and/or amphoteric surfactant of general formula (IV): $\{Chromogen\}(-Z_i^+RR'R''SAI_j)_n$, where $Z_i$=N, P; R, R', R''=alkyl or substituted alkyl of type $CH_3$, $ClC_2H_4$, $HOC_2H_4$, $C_2H_5$, $C_3H_7$; $SAI_j$=$SAA^-$, AmSAS, n=1-4;

and/or at least one salt of dichroic anionic oligomeric dye having general formula (V):
$([\{-Chromogen\}(-X_iO^-M_i^+)_n]-L_i-)_q$, where L= $(CH_2)_6$, $C_6H_4$, $C_6H_3G$-$C_6H_3G$, $C_6H_3G$-Q-$C_6H_3G$ where G=H, Hal, OH, $NH_2$, Alk and Q=O, S, NH, $CH_2$, CONH, $SO_2$, NH—CO—NH, CH=CH, N=N, CH=N; n=1-10, q=5-15;

and/or at least one water insoluble dichroic dye and/or pigment without ionogenic or hydrophilic groups;

thus the dye can contain the same ionic groups $-X_iOM_i^+$, $-X_jO^-SAI_j$, $-X_i^+RR'R''$ and/or $M_i^+$, and simultaneously can comprise several different ionic groups and/or $M_i^+$, including the variant of absence of two identical groups and/or cations; ionic groups $-X_iOM_i^+$, $-X_jO^-SAI_j$, $-X_i^+RR'R''$ can be linked directly with aromatic ring and/or through bridge $-Q_i-(CH_2)_p-$, where $Q_i$=$SO_2NH$, $SO_2$, CONH, CO, O, S, NH, $CH_2$; p=1-10.

Thus at least one Chromogen represents a chromophore system of:

azo-, azoxy- or metal complex dyes of general formula (VI-XXV):

VI

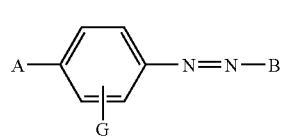

VII

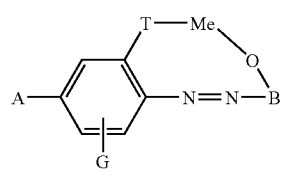

VIII

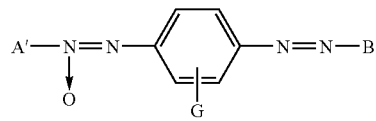

IX

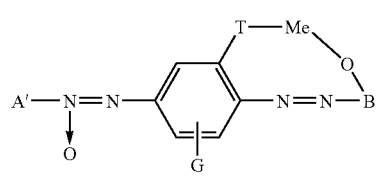

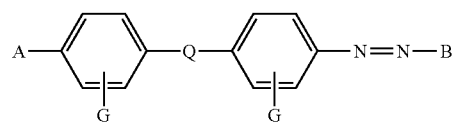
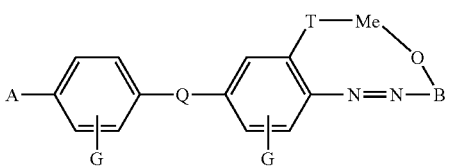
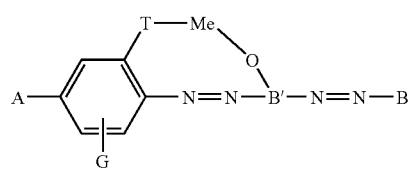
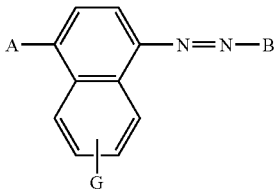
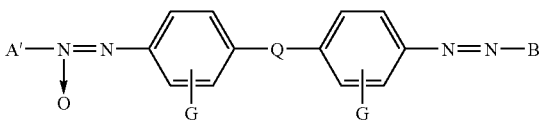
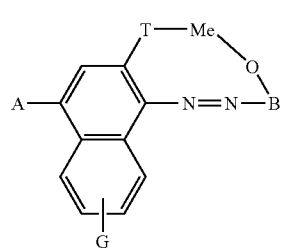
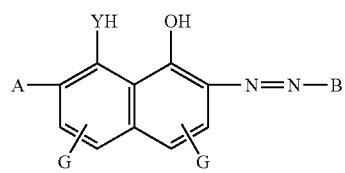
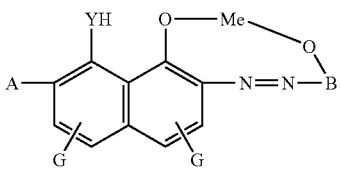
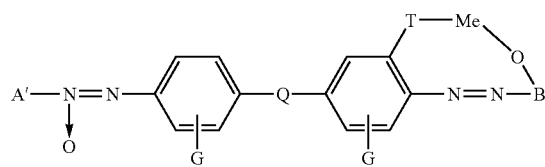
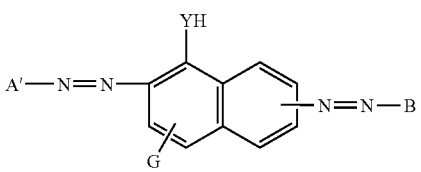
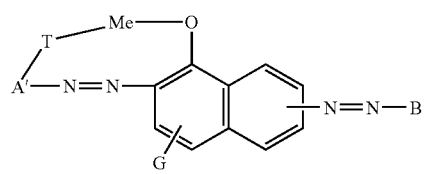
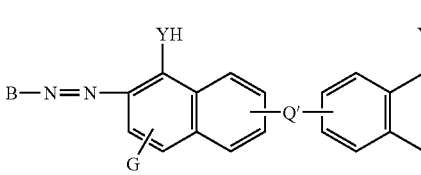
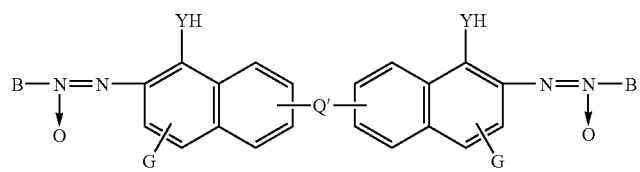
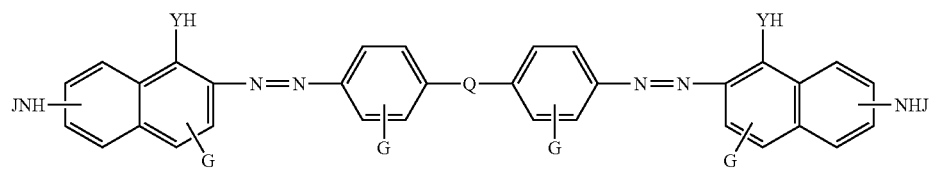
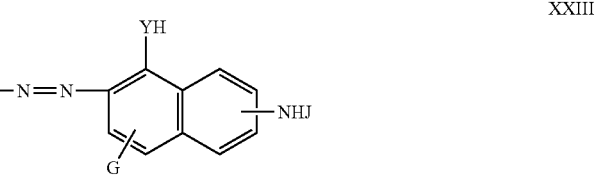

-continued
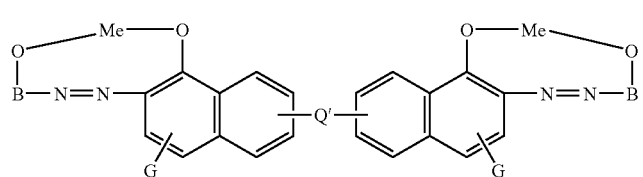
XXIV
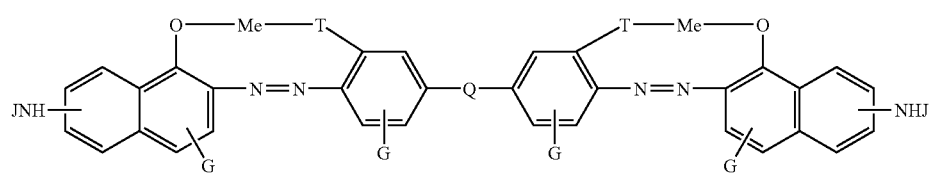
XXV
or azomethine dyes of the type (XXVI) or (XXVII):
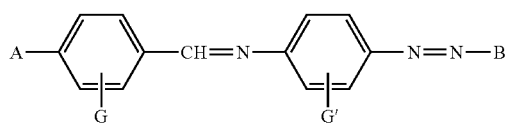
XXVI
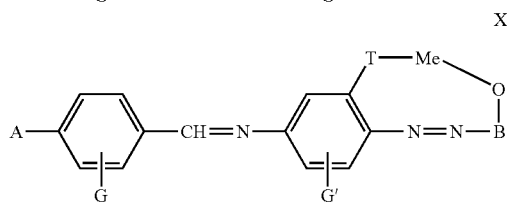
XXVII
of polymethine dyes of the type (XXXII) or (XXXIII):
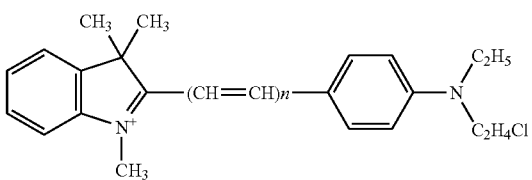
XXXII
of stilbene dyes of the type (XXVIII) or (XXXI):
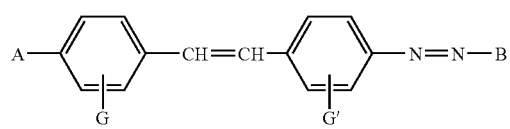
XXVIII
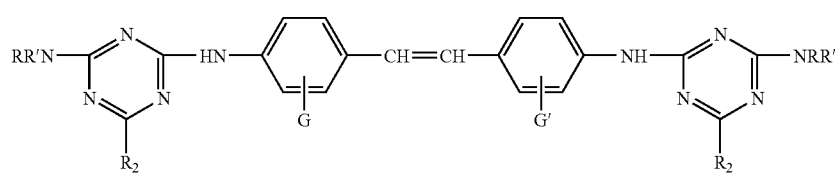
XXIX
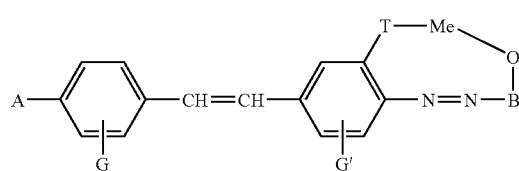
XXX
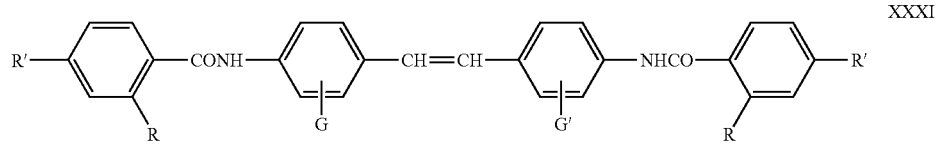
XXXI

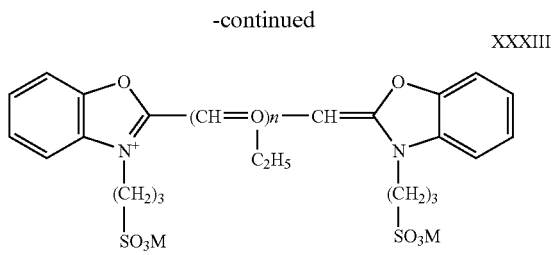

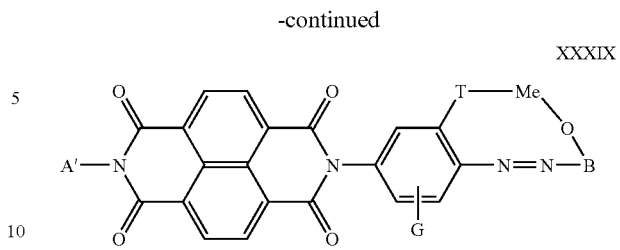

of cationic dyes of the type (XXXIV) or (XXXV):

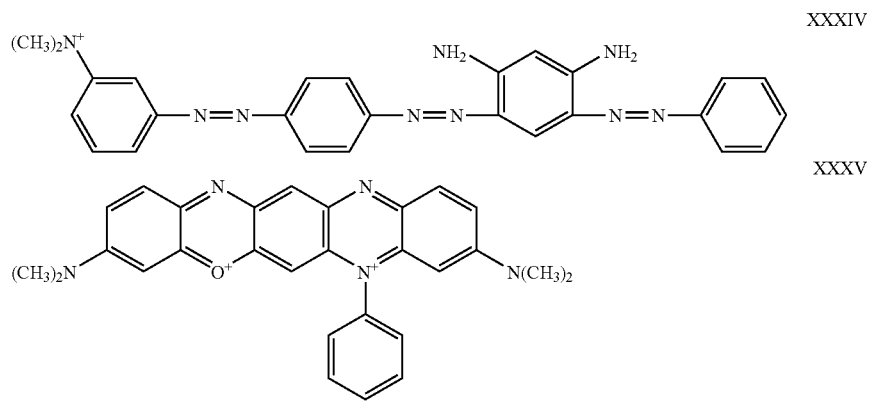

of derivatives of 1,4,5,8-naphthalene-(XXXVI) or (XXXIX), 3,4,9,10-perylene-(XXXVII) or (XL) and 3,4,9,10-anthanthrone-tetracarboxylic acids (XXXVIII) or (XLI):

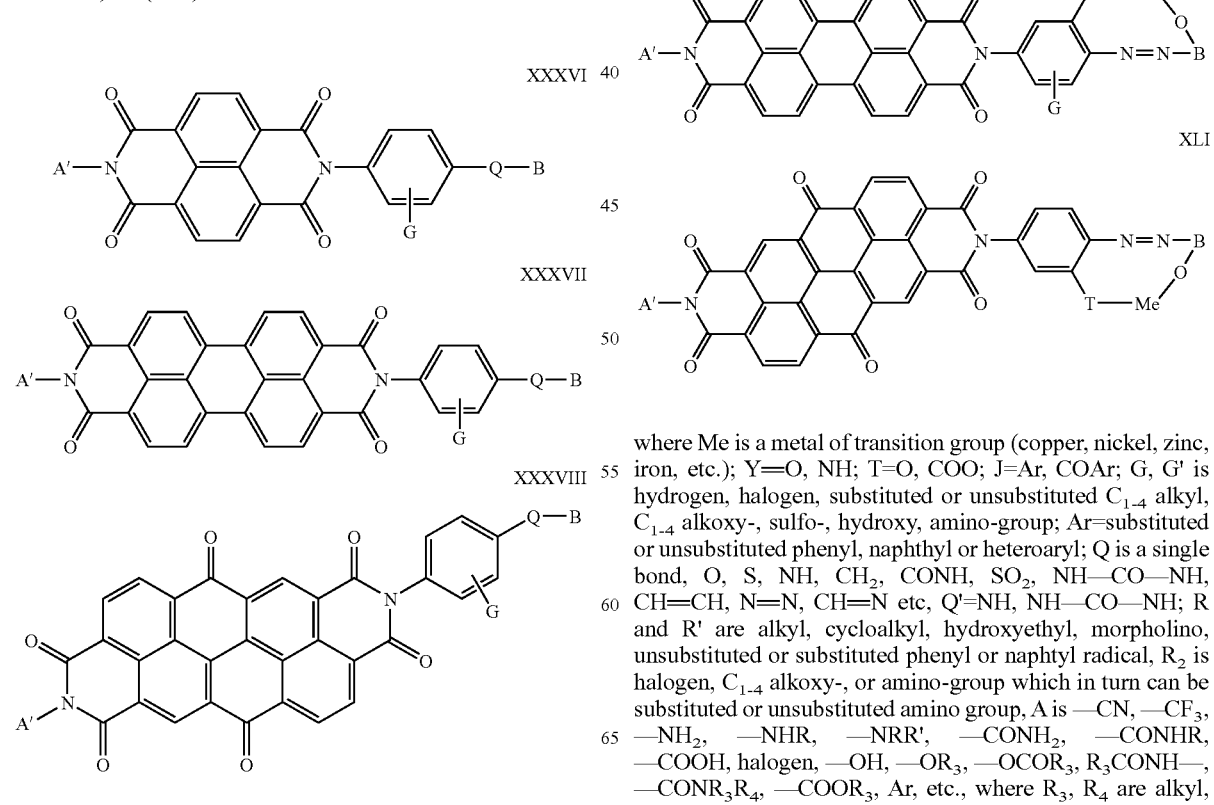

where Me is a metal of transition group (copper, nickel, zinc, iron, etc.); Y=O, NH; T=O, COO; J=Ar, COAr; G, G' is hydrogen, halogen, substituted or unsubstituted $C_{1-4}$ alkyl, $C_{1-4}$ alkoxy-, sulfo-, hydroxy, amino-group; Ar=substituted or unsubstituted phenyl, naphthyl or heteroaryl; Q is a single bond, O, S, NH, $CH_2$, CONH, $SO_2$, NH—CO—NH, CH=CH, N=N, CH=N etc, Q'=NH, NH—CO—NH; R and R' are alkyl, cycloalkyl, hydroxyethyl, morpholino, unsubstituted or substituted phenyl or naphtyl radical, $R_2$ is halogen, $C_{1-4}$ alkoxy-, or amino-group which in turn can be substituted or unsubstituted amino group, A is —CN, —$CF_3$, —$NH_2$, —NHR, —NRR', —$CONH_2$, —CONHR, —COOH, halogen, —OH, —$OR_3$, —$OCOR_3$, $R_3$CONH—, —$CONR_3R_4$, —$COOR_3$, Ar, etc., where $R_3$, $R_4$ are alkyl, cycloalkyl, aryl, aralkyl, which can be separated by O and/or S, A' or A'—N=N—, where A' is as well as B, B' substituted or unsubstituted phenyl, naphthyl or heteroaryl radical, acetoacetarylid radical, phenol or anilin radical, radical of 1- or 2-naphtol, 1- or 2-naphtylamine, which can be substituted or unsubstituted and can contain or not contain additional substituted or unsubstituted phenylazo- or naphtylazogroup; in the case of metal complex dye B, B' is the radical of 1- or 2-naphtol, which can be substituted or unsubstituted and can contain or not contain additional substituted or unsubstituted phenylazo- or naphtylazogroup, wherein hydroxygroup is disposed nearby azo-group bonded with benzol ring, having substituent G or G', and bonded with transition metal Me forming complex.

The above-mentioned variants of chromogens are an illustration only of the present invention provided as examples not limiting using of other chromophore systems of dyes for manufacture of the claimed optical device.

Thus at least one dichroic dye or pigment can be selected from a class of direct, active, acid, polimethine, cyanine, hemicyanine, vat or disperse dyes, having a structure of mono-, bis-, tris-, polyazo- or azoxy-dyes, stylbene, azomethine, thiopyronine, pyronine, acridine, anthraquinone, perynone, indigoid, oxazine, arylcarbonium, thiazine, xanthene or azine dyes, heterocyclic derivatives of di- and triarylmethanes, polycyclic or metal complex compounds, heterocyclic derivatives of anthrone, or mixture thereof.

The use of luminescent dye allows to produce a polarizer providing higher brightness, color saturation and contrast for LCD and LC indicators.

Thus, numerous groups of dichroic organic dyes can be used in one of forms (1-V) for production of the claimed optical device.

Hence, for preparation of one of forms (1-V) at least one dichroic dye can be chosen from:

stylbene dyes described for example in U.S. Pat. No. 5,007,942 or U.S. Pat. No. 5,340,504;

azo- and metal complex dyes described for example in EP 0 530 106 B1 (1996); EP 0 626 598 A2 (1994) or U.S. Pat. No. 5,318,856 (1994);

direct dyes, for example C.I. Direct Yellow 12, C.I. Direct Yellow 28, C.I. Direct Yellow 44, C.I. Direct Yellow 142, C.I. Direct Orange 6, C.I. Direct Orange 26, C.I. Direct Orange 39, C.I. Direct Orange 72, C.I. Direct Orange 107, C.I. Direct Red 2, C.I. Direct Red 31, C.I. Direct Red 79, C.I. Direct Red 81, C.I. Direct Red 240, C.I. Direct Red 247, C.I. Direct Violet 9, C.I. Direct Violet 48, C.I. Direct Violet 51, C.I. Direct Blue 1, C.I. Direct Blue 15, C.I. Direct Blue 71, C.I. Direct Blue 78, C.I. Direct Blue 98, C.I. Direct Blue 168, C.I. Direct Blue 202, C.I. Direct Brown 106, C.I. Direct Brown 223, C.I. Direct Green 85 etc;

active dyes for example, C.I. Active Yellow 1, C.I. Active Red 1, C.I. Active Red 6, C.I. Active Red 14, C.I. Active Red 46, C.I. Active Violet 1, C.I. Active Blue 9, C.I. Active Blue 10 etc;

acid dyes, for example C.I. Acid Orange 63, C.I. Acid Red 85, C.I. Acid Red 144, C.I. Acid Red 152, C.I. Acid Brown 32, C.I. Acid Violet 50, C.I. Acid Blue 18, C.I. Acid Blue 44, C.I. Acid Blue 61, C.I. Acid Blue 102, C.I. Acid Black 21 etc;

cationic dyes, for example C.I. Basic Red 12, Basic brown (C.I. 33500), C.I. Basic Black.

The dichroic dyes can be prepared in one of the forms (1-V) by known methods (see, for example, PCT Applications No. WO 99/31535, WO 00/67069).

The using of the above forms (I-V) allows to regulate hydrophobic-hydrophilic balance of a dichroic dye molecule which is a very important factor besides purity of dyes for forming of LLC phase and for variation of the colloidal-chemical including structural and rheological properties of LLC compositions based on dichroic dye. Variation of solubility and hydrophobic-hydrophilic balance allows to regulate both the process of formation and type of LLC phase that influences therefore the degree of molecular orderness and consequently polarization parameters of molecular oriented layer formed after deposition of the LLC composition on a substrate surface with subsequent removing of solvent.

The properties of dyes and LLC compositions on their base can be especially effectively regulated in case of dyes having more than three ionic groups, that is, when in the above forms (I-III, V) n or (n+m)$\geq$3. In this case it is possible to use at least three different cations $M_1^+$, $M_2^+$, $M_3^+$ etc., and each cation provides those or diverse properties. For example, combination of cation $Li^+$, which provides raised solubility, with triethanolammonium cation, which decreases degree of aggregation of dye molecules, and with tetra-butylammonium cation which stabilizes LLC phase allows to prepare LLC composition based on single molecules and/or molecular dye associates (complexes) of low association degree. It is very important for the dye to have linear molecules structure thus promoting formation of nematic LLC phase, providing more high degree of orientation by formation of molecular oriented layer that in turn provides more effective polarization of electromagnetic radiation.

It is necessary to note, that the dyes in the above mentioned forms (I-III, V) having three and more different cations providing formation of practically true solution containing separate molecules and/or molecular complexes with small degree of aggregation (not higher than 10), allow to manufacture high effective conventional polarizers based on PVA.

And on the other hand, addition of polyvalent cations such as $\frac{1}{2}Mg^{++}$, $\frac{1}{2}Ca^{++}$, $\frac{1}{2}Ba^{++}$ increases degree of aggregation in molecular complexes and results in formation of LLC phase based on the supramolecular complexes with high degree of aggregation (more than 50), which solubility can be increased by usage of surfactant ions.

It was also established, that the creation of a definite hydrophobic-hydrophylic balance allows to prepare on the basis of the same chromogen an optical device of both negative, and positive type.

Thus, a dichroic polarizer of negative type was produced on the base of mixed ammonium-tetrabutylammonium salt of direct orange dye, at the same time full triethanolammonium salt of the above dye provides a dichroic polarizer of positive type with dichroic ratio up to 40.

It was also found out that mutual transformation of optical device of positive type to negative one and inverse transformation happens under action of polarized light. It was shown on an example of some dyes transparent in visible range of light and interesting for manufacturing of optical devices—retardation layers or coatings.

It was also determined that dyes used for preparation of polarizers of negative type are capable to change orientation on the base of "guest-host" effect. Thus a dye of <<negative>> type—direct yellow lightfast <<O>> (see U.S. Pat. No. 5,739,296) mixed with a dye of <<positive>> type direct fast orange is able to form LLC phase providing preparation of a polarizer of positive type with high dichroic ratio (up to 50).

LLC compositions can be obtained either from aqueous, aqueous-organic and organic solutions of suitable dyes by gradual increase of concentration of dilute solutions (for example, by vaporization or membrane ultrafiltration), or by dissolution dry dyes in appropriate solvent (water, mixture of water with alcohols, bipolar aprotic solvents such as DMFA or DMSO, cellosolves, ethyl acetate and other solvents miscible with water) up to necessary concentration, at which one random mutual position of dyes molecules or supramolecular complexes becomes impossible and they have to acquire an ordered LC state. The dye concentration in LLC composition is varied from 0.5% to 30%.

In order to regulate colloidal-chemical properties of the LLC, a composition based on dyes in addition to solvents can comprise such technological additives and modifier as, for example, non-ionogenic and/or ionogenic surfactants, binder and film-forming reactants (polyvinylalcohol, polyvinylpyrrolidone, polyacrylic acid and its ethers, polyacrylamide, polyethylene oxide and polyethyleneglycols, polypropyleneglycol and their co-polymers, ethyl- and hydroxypropyl ethers of cellulose, sodium salt of carboxymethylcellulose etc.). LLC composition can additionally comprise hydrotropic additives from the series of amides, for example, dimethyl form amide, dimethylsulfoxide, alkylamide of phosphoric acid, carbamide and its N-substituted derivatives, N-alkylpyrrolidone, dicyandiamide and their mixtures and mixture of amides with glycols. The use of different additives allows not only to increase stability of LLC compositions but also to regulate the processes of dye molecules aggregation and consequently the process of LLC phase formation. Thus, addition of hydrotropic additive allows to prepare LLC composition based on single dye molecules.

As a result, at least one molecular oriented layer of the claimed optical device can comprise additionally not more than 50% modifying agents of different type, for example a stabilizer of light and/or hydrophilic, and/or hydrophobic polymers of different type including liquid crystal, silicone, and/or plasticizer, and/or lacquers, and/or non-ionogenic and/or ionogenic surfactants.

For forming of molecular oriented layer, a LLC composition having a local ordering is deposited on a substrate surface using known methods (see, for example, U.S. Pat. No. 5,739,296). Under action of external oriented influence, LLC composition acquires a macroscopic orientation at which a dipole moment of optical transition dye molecules or their anisotropically absorbing fragments are homogeneously oriented with respect to direction which can be predetermined either by direction of mechanical orientation or by surface anisotropy, or by influence of magnetic and electromagnetic fields. During the process of solidification (by solvent removing or by temperature decreasing) the molecules orientation is not only well preserved but also increased because of crystallization.

Orientation of LLC composition on a substrate surface under action of a shearing force can be realized by deposition of LLC composition using a die or doctor blade, which can be a knife-blade or a cylindrical type blade.

One of the methods for preparation of molecular oriented layer based on the dye in one of the forms (I-V), comprising different cations $M_i$, provides treatment of formed layer with a solution of barium, calcium or magnesium chloride. By this treatment the molecular oriented layer comprising simultaneously cations of lithium, sodium, potassium, ammonium, ethanolammonium, alkylammonium, barium, calcium or magnesium, etc can be obtained.

The use of organic dyes having anisotropic absorbance for dichroic material provides preparation of optical devices, wherein the molecular oriented layer has a thickness (depending on dye) within a range from about 1 nanometer to about 5 micrometers.

Thickness of the molecular oriented layer depends on absorption coefficient, and an optical device is preferable, wherein absorption coefficient of molecular oriented layer is not less than 0.1 at least in some wavelengths range of electromagnetic radiation. Higher absorption coefficient and consequently thinner molecular oriented layer provides required efficiency of polarization of electromagnetic radiation.

According to the present invention depending on dichroic dye structure it is possible to provide a variant of optical device, wherein the dichroic material molecule additionally comprises at least one anisotropically absorbing fragment, wherein projection of an optical transition dipole moment on the surface of molecular oriented layer has a preferable orientation perpendicular to optical axis of molecular oriented layer at least in certain wavelengths range of electromagnetic radiation. Thus, practically all dichroic dyes have absorption not only in the visible region, but in UV and IR wavelengths range. Often the optical transition dipole moment in UV region reveals another orientation, including orientation perpendicular to optical axis of molecular oriented layer.

This feature allows to fabricate a device capable to operate as a positive polarizer in one wavelengths range and as a negative polarizer in another wavelengths range that is to say as a "color switch".

The similar effect is achieved in optical device, wherein the molecular oriented layer additionally comprises at least one dye solubilized or chemically bonded with dichroic material molecules, wherein at least one optical transition dipole moment is either parallel or perpendicular to optical axis of molecular oriented layer at least in certain wavelengths range of electromagnetic radiation. For fabrication of such device the molecular oriented layer based on anionic dye is treated with cationic dye, whereby under influence of the layer anisotropy, orientation of dipole moment can be placed both parallel and perpendicular to optical axis of molecular oriented layer.

At least one molecular oriented layer used in the claimed optical device is birefringent anisotropically absorbing layer, which has the feature of "abnormal dispersion", that is, said layer has at least one refractive index growing at increasing of wavelength of polarization light. It results in turn in considerable growth of the birefringence value which can greatly exceed the birefringence value (0.2) for the polymeric materials and provides possibility to obtain in the claimed device a birefringent anisotropically absorbing layer of value 0.7-0.8.

The above feature allows to create variants of the claimed optical device similar to described in international PCT Application No. WO 99/31535, that is, besides dichroic polarizers to create polarizers, utilizing more than 50% of the incident light energy, polarizers of "interference type", and also LCD, wherein at least one birefringent layer has a thickness whereby the interference extremum is realized at output of the polarizer for at least one linearly-polarized light component. More preferable version of the claimed optical device is a device, wherein the thickness of at least one birefringent anisotropically absorbing layer satisfies the condition of obtaining at output of the polarizer the interference minimum for one linearly-polarized light component and, simultaneously, the interference maximum for other orthogonal linearly-polarized light component.

The high birefringence value allows to dramatically diminish the necessary number of layers (less than 10) to provide high polarization performance of the optical device of "interference type" in wide spectral region.

The following embodiment of the claimed optical device, being an analog to the one described in international PCT Application No. WO 99/31535, is possible:

the optical device, further comprising at least one optically isotropic layer which refractive index coincides with or maximally proximates to one of refractive indices of the birefringent anisotropically absorbing layer;

the optical device, further comprising at least one birefringent layer one refractive index of which layer coincides with, or maximally proximates to one of refractive indices of the birefringent anisotropically absorbing layer, and a second refractive index of the birefringent layer and birefringent anisotropically absorbing layers differ from one another;

the optical device, wherein at least one molecular oriented layer comprises at least two fragments of an arbitrary form or shape, which differ by color and/or direction of polarization axis;

the optical device, further comprising between molecular oriented layers the layers formed of color or colorless materials;

the optical device, further comprising an alignment layer formed of inorganic materials and/or different polymer materials;

the optical device, further comprising a light-reflecting layer, which can be metallic;

the optical device, wherein at least one molecular oriented layer is formed on a substrate surface;

the optical device being a circular polarizer, comprising a birefringent plate or film as the substrate, wherein at least one molecular oriented layer is formed at angle of 45° to the main optical axis of said plate or film.

The using cheap polymeric films as a substrate, including optically anisotropic films such as polyethyleneterephtalate (PET), polycarbonate, polyvinyl chloride or polyvinylydene chloride, nitrocellulose, polyamide or combined, for example, PET doubled by polyethylene, allows to fabricate cheap optical devices—plastic LCD with internal polarizers.

The using lens of arbitrary curvature as substrate allows to fabricate an optical device in form of polarization glasses or shades.

The using of an additional adhesive layer disposed between the substrate and molecular oriented layer, allows to create the claimed optical device, stable to physical-chemical and physical-mechanical actions.

Presence of an additional adhesive layer provides strong bond between the substrate and the molecular oriented layer. Moreover, the above adhesive layer with protective layer greatly increases not only mechanical durability of the molecular oriented layer and consequently of the optical device, but based on the suitable adhesive and protective layer improves resistance to physical-chemical actions, in particularly, protects from effect of moisture and aggressive atmosphere. It allows to fabricate devices for exploitation in aggressive conditions (antiglare sun glasses, shades, visors, glass for automotive industry and architecture).

For the preparation of the optical device with additional adhesive layer it is used a technology of "hot embossing (stamping)". Different kinds of embossing (positive, negative, reverse, etc) can be used for forming of drawings on the surface of different materials, including paper, leather, polymers, wood. Presses of different types can be used for embossing to form imprints on a wares of different geometric forms (see Gilyalitdinov L. P., Foil for hot embossing, Moscow, 1981).

For realization of the technology of "hot embossing (stamping)" the multilayer material comprises a temporary substrate, at least one dividing layer, providing separation of the temporary substrate, and at least one molecular oriented layer of dichroic material, capable to form the stable LLC phase.

The function principle of the above multilayer material is based on easy transfer (without destruction) of molecular oriented layer of dichroic material from a temporary substrate on the required substrate surface due to presence of a dividing layer. The transfer can be realized both for whole oriented layer and for a part of this layer. It is especially important for forming of polarization drawings. Depending on the properties the dividing layer can remain on the substrate at transfer of the molecular oriented layer or can be transferred with the oriented layer to the substrate. Using this filed multilayer material a simple technology of layer-by-layer formation of oriented layers can be realized. It is especially important for the technology of preparation of polarizers of interference type.

By using a flexible polymeric film as the substrate the above multilayer material allows to realize very simple and effective technology of formation of oriented layers on the surfaces of arbitrary curvature. It is very important for fabrication of polarization glasses and face shields.

By realization of layer-by-layer technology using a multilayer material the direction of polarization for every next layer relative to previous layer can be predetermined in certain degree.

The above multilayer material allows to use at the fabrication of an optical device not only a substrate with a smooth polished non-absorptive surface, but rough and absorptive materials such as paper, Whatman drawing paper, cardboard, nonwoven material or cloth (cotton, wool, polyamide, polyester, etc). It is very important especially for using the claimed device for protection of trademark, advertisement, clothes using effect of polarization, polarization labels for packages, etc.

Adhesive layer in the claimed optical device can be isotropic or anisotropic, transparent, color or colorless depending on character and method of deposition. The optical device can further comprise a lacquer layer and/or a drawing layer between the adhesive and the molecular oriented layers.

Adhesive layer can be formed on the basis of two-component, photo- or thermo-hardening glues, pressure sensitive or moisture sensitive adhesives, melting adhesive or non-hardening adhesive.

An adhesive based on alkyd, acryl, phenolo-aldehydro, epoxy, polyurethane, polyisocyanate, elemento-organic resins and on polymeric materials (polyolefins, polyacetylenes, polyesters, polycyanacrylates, polyacrylates, polyamides, polyvinylbutyral, polyvinylalkohol, polyvinylchloride, polyvinylacetate and their copolymers) is used for the forming of the adhesive layer.

DESCRIPTION OF THE PREFERRED EMBODIMENTS

Synthesis of the Dyes

The commercially available dyes were purified from organic and inorganic impurities using conventional methods (a multiple reprecipitation, chromatography, purification on ion-exchange resins and using ultra-filtration).

Synthesis and purification of the dyes was realized using standard methods (see. L. N. Nikolenko, Labor practicum of intermediates and dyes, Moscow-1961, K. Venkataraman, The chemistry of organic dyes, Leningrad-1956, and also see U.S. Pat. No. 5,007,942 or U.S. Pat. No. 5,340,504—stylbene dyes, EP 0 530 106 B1, EP 0 626 598 A2 or U.S. Pat. No. 5,318,856—azo- and metal complex dyes).

Example 1

1.1. The Procedure of Iono-Exchange Purification of Dyes Solution (On the Example of Direct Yellow Fast Dye)

0.5% Solution of direct yellow fast dye in distilled water was filtered through the column with cationite resin of KRS-4-T type in H-form and then through the column with anionit resin AN-2FN in OH-form, and finally this solution was purified by filtration through a fiberglass filter.

1.2. The Procedure of Preparation of Dyes Salts Solutions a) 0.5% Solution of direct yellow fast dye (as free acid after ion-exchange purification) was titrated at room temperature with 0.5 N ammonium hydroxide up to pH value ~7-7.5. The resultant solution was filtered through a glass filter No. 4 with filter "Millipor" (1µ), which was previously washed with water.

The other salts were prepared in the similar way using suitable bases (NaOH, CsOH, LiOH, KOH, triethanolamine, triethylamine, tetrabutylammonium hydroxide, tetramethylammonium hydroxide, trimethylbenzylammonium hydroxide and other bases). Preparation of mixed salts was realized by successive titration using at first one mole of one base, then second base, etc.

b) Triethanolamine was added to solution of ammonium salt, the quantity of triethanolamine was calculated at the rate of 4 sulfonic groups, the resultant mixture was stirred during 2 hrs at 60° C. to obtain a solution of triethylammonium salt of dye.

1.3. The Procedure of Preparation of LLC Composition (See, for Example, U.S. Pat. No. 5,739,296)

The solution of triethylammonium salt of dye was concentrated on a rotary evaporator at bath temperature 40° C., vacuum 15-20 mm Hg up to resultant viscosity of dye solution 50-70 centipoises (dye concentration 10-12%). Forming of LLC phase can be fixed by observation of sample using polarization microscope with two crossed polarizers.

The solution of technological additives, comprising PEG-400 and/or PEG-2000-2-6%, non-ionogenic surfactant of type Tritone X-100-1-4% and/or anionic surfactant of type Succinol ALM-24, n-butanol-3-7%, was added to concentrated dye solution.

1.4. Forming of molecular oriented layer was realized using known methods (see, for example, Russian Patent No. 2110822, U.S. Pat. No. 5,739,296 or PCT Application No. WO 99/31535). The polarization spectra were measured on spectrophotometer "Specord M-40" using Iodine polarizer as a polarizer with efficiency 99.9% and transmittance 40%. The absorption of polarizer sample on glass was measured by orientation of polarization axis perpendicularly ($D_\perp$) and parallel ($D_{II}$) to the plane of polarization of the spectrophotometer. The sample of substrate was placed in channel comparison. Dichroic ratio was calculated at maximum absorption using formula $Kd=D_\perp/D_{II}=45$.

1.5. Forming of Molecular Oriented Layer on the Surface of a Glass Lens of Arbitrary Curvature Using a centrifuge an adhesive layer based on polyvinylbutyral was deposited on the lens surface, then under pressure at 100-110° C. a multilayer material was rolled up to the lens, the material comprised 12 µm PET film, on which a dividing waxy layer, a layer of parquet lacquer, a molecular oriented layer based on mixed ammonium-triethanolammonium (1:1) salt of direct yellow fast dye were deposited layer-by-layer. After exposition of 5-8 min the pressure was removed and the final polarization lens was separated to insert in a holder for the fabrication of polarization glasses.

1.6. Preparation of Multilayer Material

A layer of aqua waxy emulsion was deposited using roll method on PET film having width of 120 mm, thickness of 12 µm, in the similar way after drying it was deposited a lacquer NC-218. After drying the LLC composition of triethanolammonium salt of direct yellow fast dye was deposited using a doctor over the lacquer layer and dried. Then the layer of polyisobutylene was deposited using a doctor. The finished multilayer material was applied to a surface of paper or cloth and after embossing (stamping) with press of required profile a polarized orange color drawing was obtained on the surface of paper or cloth after separation of multilayer material.

Examples 2-30

An optical devices based on other dyes can be prepared in the similar way (see Table in p. 24).

Example 31

Fabrication of the Claimed Optical Device as a Homogeneous Phase Delay Layer

Retarder with an Optical Axis Parallel to the Surface

LLC composition based on the dye (see Table in p. 24, example 3), transparent in a visible wavelengths range was applied using a rolling cylinder on the surface of a glass plate coated with a transparent conducting layer ITO. After solvent vaporization, molecular oriented layer of 0.9 µm thickness was formed on the plate surface with the optical axis parallel to the surface of the layer. The value of the phase delay (retardation) R was equal 0.27 µm for polarized light falling perpendicularly to the surface of the layer, the highest refractive index was along the optical axis. Anisotropic absorbing fragments of molecules of the dichroic material of said layer were parallel to the optical axis of the layer, and the absorption existed only in UV range (less than 390 nm).

Example 32

Fabrication of the Claimed Optical Device as an Inclined Phase Delay Layer

Inclined or Non-Symmetrical Retarder

LLC composition containing 9% of dye (see Table in p. 24, example 3) and comprising as one of cations dodecylammonium, providing hydrophoby, was coated using a doctor blade on the surface of a PET film. After drying at a room temperature, 0.3 μm molecular oriented layer was formed with the optic axis parallel to the surface of the layer. The value of phase delay R was equal 0.09 μm (i.e. 90 nm) for a polarized light falling perpendicularly to the surface of the layer, the highest refractive index was parallel to the direction approximately at 40° to the coating direction. Anisotropically absorbing fragments of dichroic material molecules of said layer were directed at angle 40° to the coating direction, and the absorption was present only in UV range (less than 390 nm). The formed layer was then transferred on the surface of a glass plate with the conducting ITO, covered with adhesive layer.

Example 33

Fabrication of the Claimed Optical Device as a Homeotropic Phase Delay Layer

Homeotropic Retarder

LLC composition, containing 9% of dye (see Table in p. 24, example 3) and comprising dodecylammonium as one of cations, providing hydrophoby, was coated using a doctor blade on the surface of a cellulose triacetate film. The LLC composition contained also hydrophobic modifying agents providing practically perfect homeotropic orientation of molecules into a layer. After drying at a room temperature 0.2 μm molecular oriented layer was formed with the optic axis perpendicular to the surface of the layer. The value of phase delay R was equal to 80 nm for direction of the polarized light at 40° to the surface of the layer. The highest refractive index was directed at angle 85°-88° to the coating direction and anisotropically absorbing molecules were directed at the same angle. The absorption was present only in UV range (less than 390 nm).

As it is seen from the above mentioned data, the claimed optical devices provide effective polarization of light (dichroic ratio not less than 35).

Besides durability tests have shown, that the optical parameters of said polarizers do not vary for a long time (more than 500 hours) at 150° C.

Thus, usage for fabrication of an optical device the molecular oriented layer, wherein a projection of a optical transition dipole moment for at least one anisotropically absorbing fragment of dichroic material molecule, capable to form a stable lyotropic liquid crystal phase, on the molecular oriented layer plane is substantially parallel to the optical axis of the molecular oriented layer at least in a certain wavelengths range of electromagnetic radiation, provides a high polarization efficiency.

INDUSTRIAL APPLICABILITY OF THE INVENTION

The claimed optical device can be used as dichroic, interference polarizer, retarders, liquid crystal displays and indicators, in luminaries, optical modulators, matrix systems of light modulation, in production of polarizing films, for production of consumer goods such as sun-glasses, shields.

Parameters of optical devices based on the dichroic dyes in forms (I-V)

| No | Dye structure |
|----|---|
| 1. | (structure with NH₂—C₆H₃(SO₃⁻M₁⁺)—CH=CH—C₆H₃(SO₃⁻M₁⁺)—N=N—C₆H₃(SO₃⁻M₂⁺)—CH=CH—C₆H₃(SO₃⁻M₂⁺)—N=N— repeating unit, shown twice) |
| 2. | (analogous structure to 1 but with O₂N— terminal groups and N-oxide azo linkages —N⁺(O⁻)=N—) |
| 3. | [—CH=CH—C₆H₃(SO₃⁻M₁⁺)—NH—(triazine: C₃N₃ with NHCH₂CH₂OH substituent)—NH—naphthyl(SO₃⁻M₂⁺)—]₂ |

Parameters of optical devices based on the dichroic dyes in forms (I-V)
4. 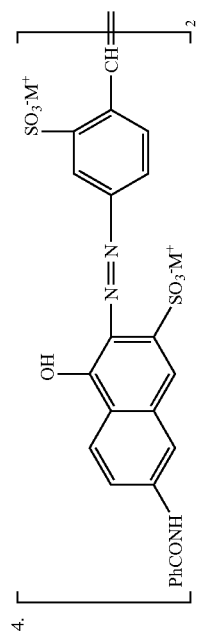
5. 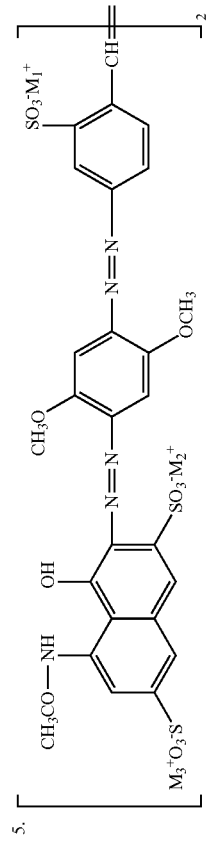
6. 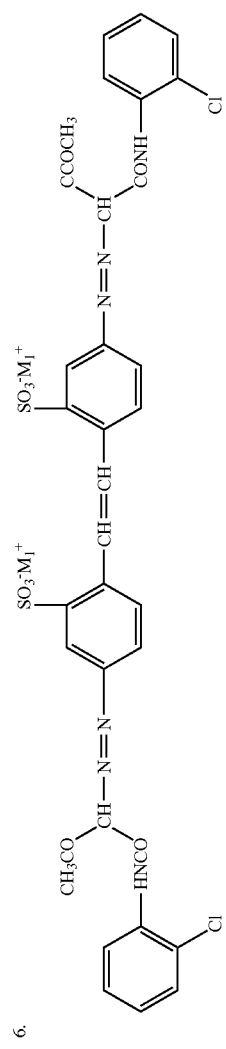
+ dye from example 4 (1:2)
7. 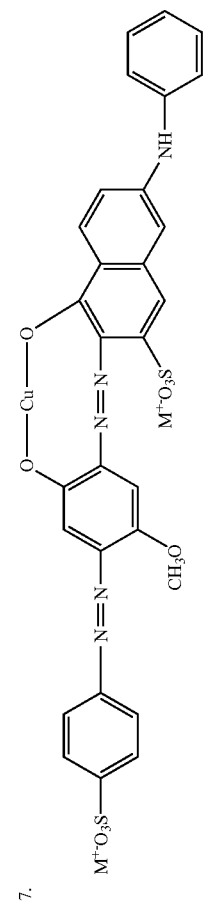

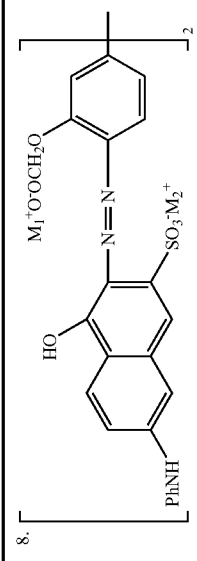
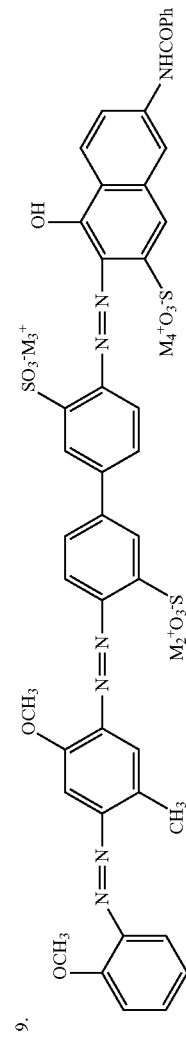
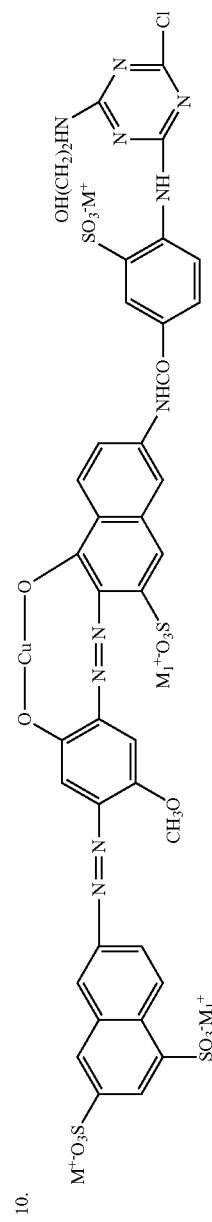
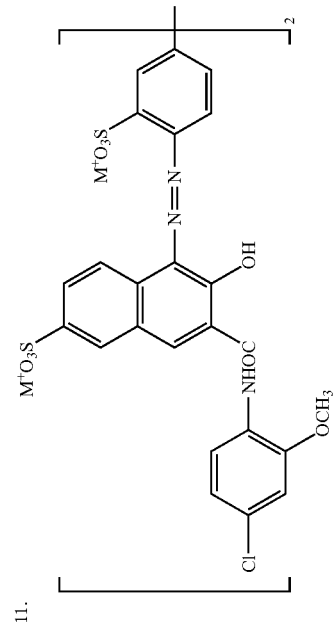

Parameters of optical devices based on the dichroic dyes in forms (I-V)
12. 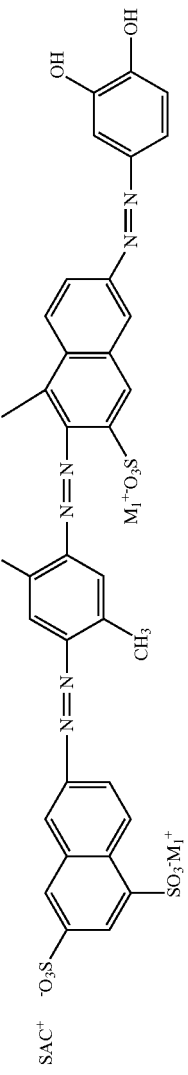
13. 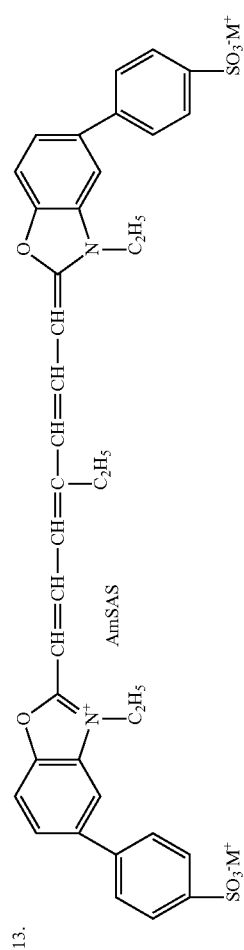
14. 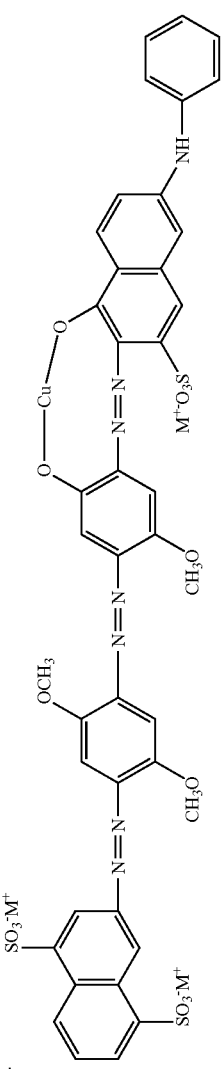
15. 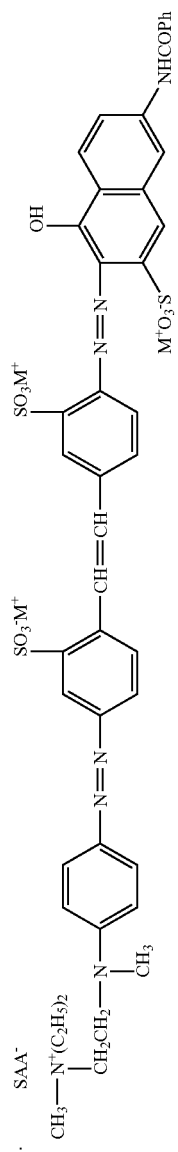

Parameters of optical devices based on the dichroic dyes in forms (I-V)
16. 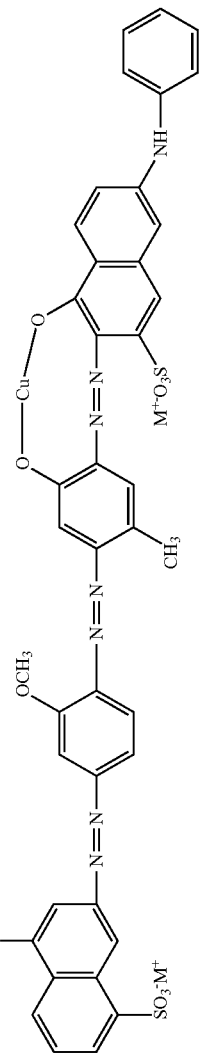
17. 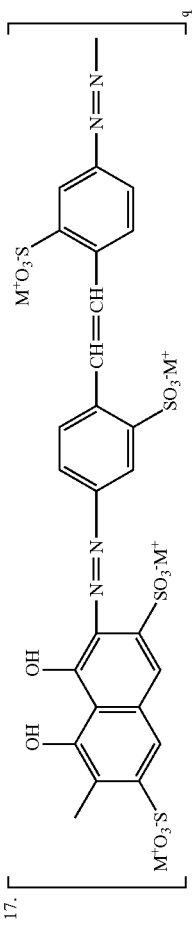
18. 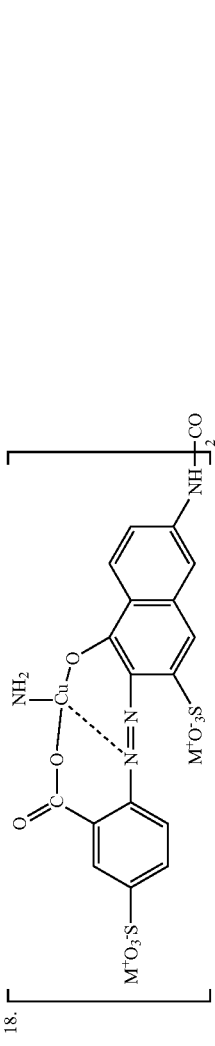
19. 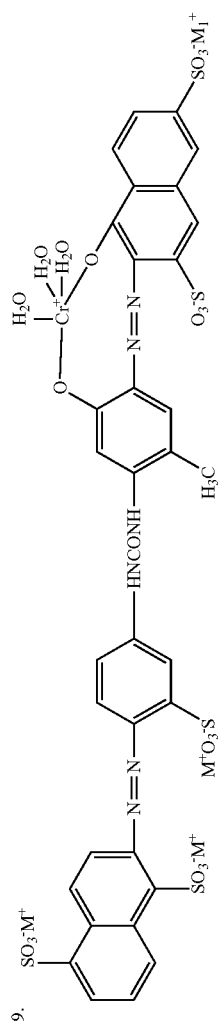

-continued
Parameters of optical devices based on the dichroic dyes in forms (I-V)
20. 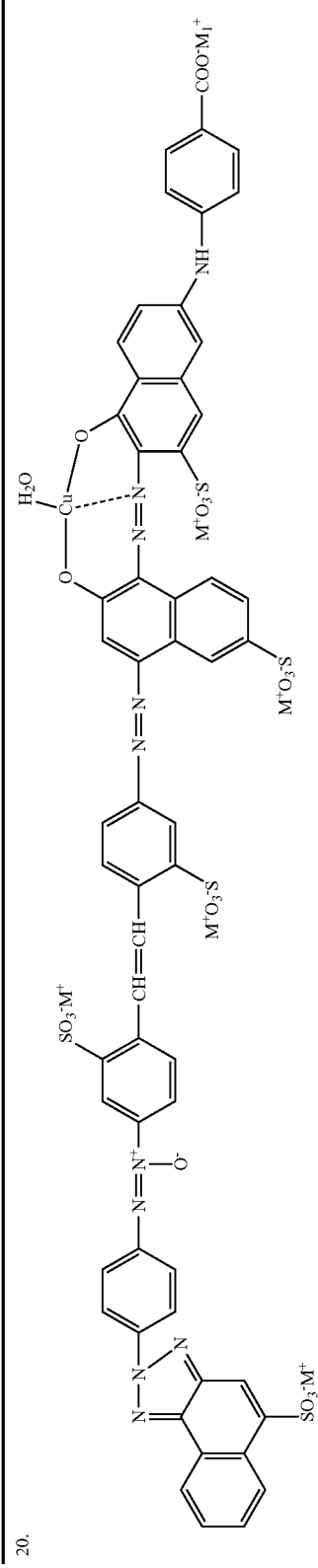
21. 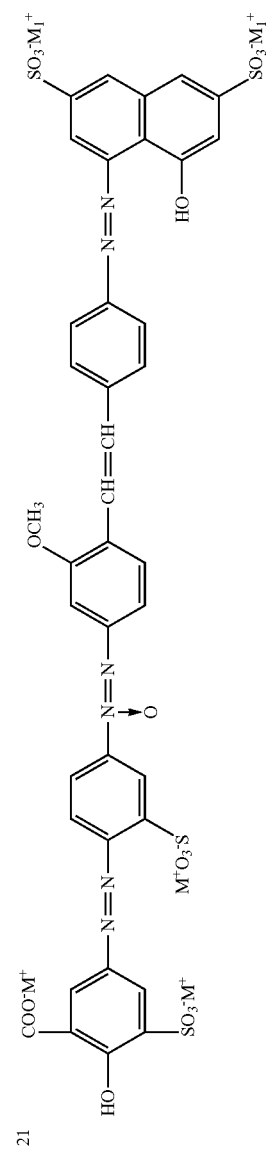
22. 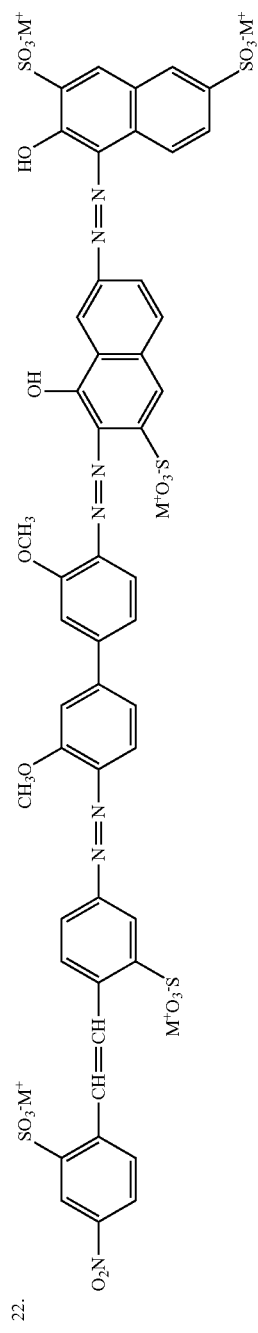

-continued
Parameters of optical devices based on the dichroic dyes in forms (I-V)
23. 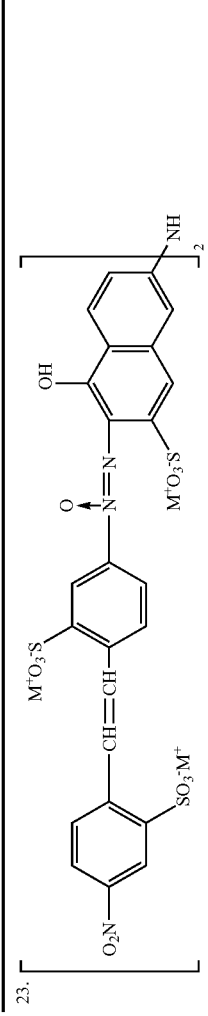
24. 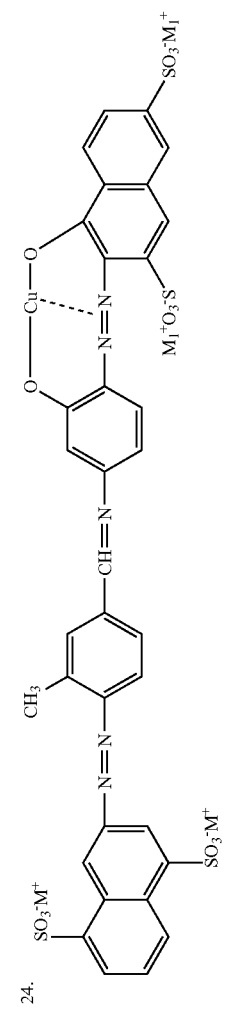
25. 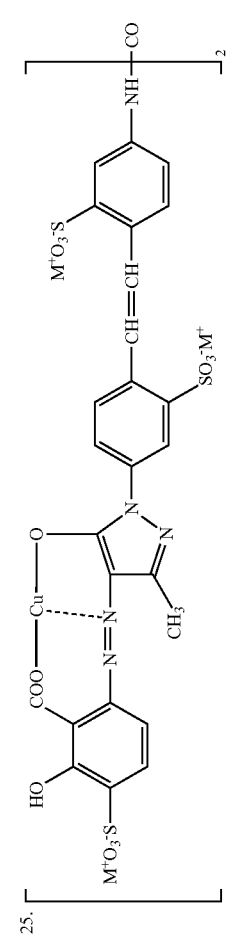
26. 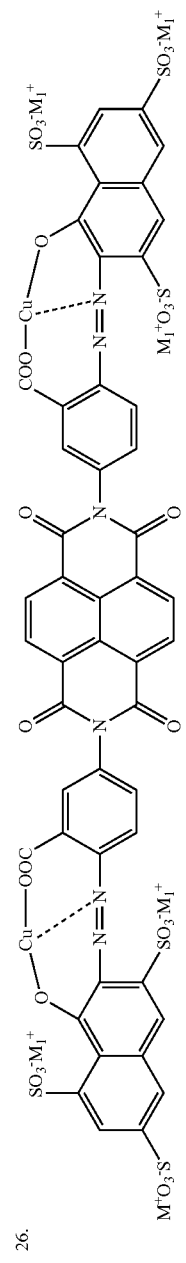
27. 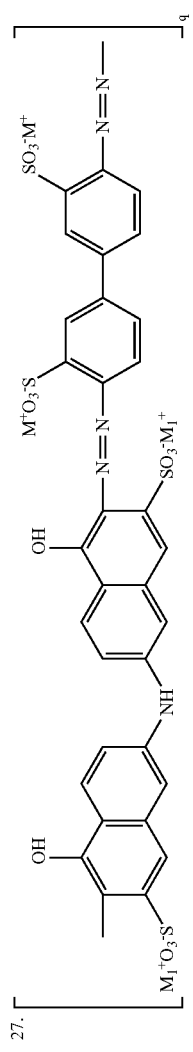

-continued

Parameters of optical devices based on the dichroic dyes in forms (I-V)

| No 1 | | $M_I^+$ 3 | $Kd^* = D_⊥/D_∥$ 4 |
|---|---|---|---|
| 28. | [Structure: naphthalene with OH, N=N-phenyl-SO₃M₁⁺, and ClC₆H₄CONH, [CH=]₂ with SO₃M₁⁺] | | |
| 1. | | (I), $M_1^+$ = triethanol-ammonium, $M_2^+$ = ammonium | 45 (448 nm) |
| 29. | [Structure: naphthalene with OH, CH₃O, N=N-phenyl with SO₃M₂⁺ and OH, [C]₂ with CH₃O and SO₃M⁺] | | |
| 2. | | (I), $M_1^+$ = diethyl-ammonium, $M_2^+$ = Li⁺ | 50 (410 nm) |
| 30. | [Structure: naphthalene with Zn-O bridges, NH-C₆H₄-SO₃M⁺, N=N-phenyl-CH₃, O-phenyl-SO₃M₂⁺, [CH=]₂ with SO₃M₁⁺] | | |
| 3. | | (I), $M_1^+$ = N-methyl-pyridinium $M_2^+$ = triethyl-ammonium | 35 (345 nm) |

-continued

Parameters of optical devices based on the dichroic dyes in forms (I-V)

| | | |
|---|---|---|
| 4. | (I), M⁺ = diethanol-ammonium | 100 (645 nm) |
| 5. | (I), M₁⁺ = Li⁺, M₂⁺ = NH₄⁺, and M₃⁺ = HOCH₂CH₂(OCH₂—CH₂)₂NH₃⁺ | 75 (635 nm) |
| 6. | (I), M₁⁺ = triethanol-ammonium | 45 (403 nm) 68 (645 nm) |
| 7. | (I), M₁⁺ = triethanol-ammonium | 40 (625 nm) |
| 8. | (I), M₁⁺ = Cs⁺, M₂⁺ = NH₄⁺ | 37 (650 nm) |
| 9. | (I), M₁⁺ = Cs⁺, M₂⁺ = NH₄⁺, M₃⁺ = Li⁺, M₄⁺ = triethanol-ammonium | 42 (595 nm) |
| 10. | (I), M₁⁺ = Li⁺, M⁺ = N-methyl-pyridinium | 40 (605 nm) |
| 11. | (II), M⁺ = HOCH₂CH₂(OCH₂CH₂)₄NH₃⁺ | 35 (565 nm) |
| 12. | (II), SAC⁺ = C₁₂H₂₅NH₃⁺ and M⁺ = HOCH₂CH₂OCH₂CH₂NH₃⁺ | 39 (605 nm) |
| 13. | (III, AmSAS-octyldimethyl-ammonium ethansulfonate, triethanol-ammonium salt, M⁺ = (OHCH₂CH₂)₃NH⁺ | 35 (555 nm) |
| 14. | (I), M = (CH₃)₃C₆H₅CH₂P⁺ | 80 (605 nm) |

-continued

Parameters of optical devices based on the dichroic dyes in forms (I-V)

| | | |
|---|---|---|
| 15. | (IV), SAA⁻ = dodecyl-sulfonate M⁺ = (CH₃)₃C₆H₅CH₂P⁺ | 57 (590 nm) |
| 16. | (I), M⁺ = N-ethyl-quinolinium cation | 53 (600 nm) |
| 17. | (V), q = 3, M⁺ = triethanol-ammonium⁻ | 81 (590 nm) |
| 18. | (I), M⁺ = triethanol-ammonium | 35 (530 nm) |
| 19. | (II), M⁺ = Li⁺, M₁⁺ = C₁₂H₂₅NH₃⁺ | 36 (520 nm) |
| 20. | (I), M⁺ = HOCH₂CH₂—NHCH₂CH₂NH₃⁺ M₁⁺ = (C₄H₉)₄N⁺ | 90 (550 nm) |
| 21 | (I), M₁⁺ = N-methyl-thiazolinium cation M⁺ = Li⁺ | 45 (565 nm) |
| 22. | (I), M⁺ = HOCH₂CH₂—(OCH₂CH₂)₈NH₃⁺ | 60 (580 nm) |
| 23. | (I), M⁺ = (CH₃)₃C₆H₅CH₂P⁺ | 35 (590 nm) |
| 24. | (I), M⁺ = Li⁺, M₁⁺ = NH₄⁺ | 43 (505 nm) |
| 25. | (I), M⁺ = N-methyl-thiazolinium | 55 (425 nm) |

-continued

| | Parameters of optical devices based on the dichroic dyes in forms (I-V) |
|---|---|
| 26. | (I), $M_1^+$ = Li$^+$ and $M^+$ = (OHCH$_2$CH$_2$)$_2$NH$_2^+$ <br> 37 (480 nm) |
| 27. | (V), q = 10, $M^+$ = PhCH$_2$(CH$_3$)$_3$N$^+$ <br> 46 (630 nm) |
| 28. | (I), $M_1^+$ = Li$^+$ and $M^+$ = (OHCH$_2$CH$_2$)$_2$NH$_2^+$ <br> 105 (650 nm) |
| 29. | (II), $M^+$ = C$_{12}$H$_{25}$NH$_3^+$; Mphd 1$^+$ = Li$^+$; $M_2^+$ = triethanol-ammonium <br> 110 (620 nm) |
| 30. | (I), $M^+$ = NH$_4^+$; $M_1^+$ = Li$^+$; $M_2^+$ = diethanol-ammonium <br> 95 (635 nm) |

*Dichroic ratio (at the maximum of absorption)

The invention claimed is:

1. An optical device comprising at least one molecular oriented layer of low molecular weight or oligomeric dichroic material, capable to form stable lyotropic liquid crystal phase, wherein a projection of an optical transition dipole moment on the molecular oriented layer plane is substantially parallel to the optical axis of the molecular oriented layer, having a dichroic ratio not less than 35, for at least one anisotropically absorbing fragment of dichroic material molecule at least in a certain wavelengths range of electromagnetic radiation.

2. The optical device according to claim 1, wherein the optical transition dipole moment is substantially parallel to the optical axis of said molecular oriented layer for at least one anisotropically absorbing fragment of dichroic material molecule.

3. The optical device according to claim 1, wherein the dichroic material molecule has a linear structure.

4. The optical device according to claim 1, wherein at least one anisotropically absorbing fragment of dichroic material has absorption in the visible spectral wavelengths range (400-700 nm).

5. The optical device according to claim 1, wherein at least one molecular oriented layer of dichroic material is transparent in the visible spectral wavelengths range (400-700 mm).

6. The optical device according to claim 1, wherein a thickness of the molecular oriented layer of dichroic material ranges from 1 nm to 5 μm.

7. The optical device according to claim 1, wherein an absorption coefficient of molecular oriented layer of dichroic material is not less than 0.1 at least in some wavelengths range of electromagnetic radiation.

8. The optical device according to claim 1, wherein at least one molecular oriented layer is a birefringent anisotropically absorbing layer and possesses at least one refractive index growing at increasing of the wavelength of polarized light at least in some wavelengths range of electromagnetic radiation.

9. The optical device according to claim 1, wherein at least one birefringent anisotropically absorbing layer has a thickness providing realization of the interference extremum at output of the device for at least one linearly-polarized light component.

10. The optical device according to claim 1, wherein at least one molecular oriented layer is formed on the base of:
at least one salt of dichroic anionic dye having general formula (I): {Chromogen}$(-X_iO^-M_i^+)_n$, where Chromogen is hereinbelow a dye chromophore system; $X_i$ (hereinbelow)=CO, $SO_2$, $OSO_2$, $OP(O^-M^+)$; n=1-20, $M_i^+$ (hereinbelow)=$H^+$ and/or $M_H^+$ and/or $M_o^+$, wherein $M_H^+$ represents (hereinbelow) an inorganic cation of the following type $NH_4^+$, $Li^+$, $Na^+$, $K^+$, $Cs^+$, $½Mg^{++}$, $½Ca^{++}$, $½Ba^{++}$, $⅓Fe^{+++}$, $½Ni^{++}$, $½Co^{++}$, $M_o^+$ represents (hereinbelow) an organic cation of the following type N-alkylpyridinium, N-alkylchinolinium, N-alkylimidazolinium, N-alkylthiazolinium, OH—$(CH_2$—$CH_2O)_m$—$CH_2CH_2$—$NH_3^+$ where m=1-9, $RR'NH_2^+$, $RR'R''NH^+$, $RR'R''R*N^+$, $RR'R''R*P^+$ where R, R', R'', R*=alkyl or substituted alkyl of the type $CH_3$, $HOC_2H_4$, $C_2H_5$, $C_3H_7$, $C_4H_9$, $C_6H_5CH_2$, substituted or unsubstituted phenyl or heteroaryl; YH—$(CH_2$—$CH_2Y)_k$—$CH_2CH_2$, Y=O or NH, k=0-10;
and/or at least one associate of a dichroic anionic dye with surface-active cation and/or amphoteric surfactant of general formula (II): $(Mi^+O^-Xi^-)_n${Chromogen}$(-X_jO^-SAI_j)_m$, where Xj (hereinbelow)=CO, $SO_2$, $OSO_2$, $OP(O^-M^+)$; n=0-19, m=1-4; $M_i^+=H^+$ and/or $M_o^+$ and/or $M_H^+$; $SAI_j$ (hereinbelow surface-active ion)=$SAC^+$ and/or AmSAS, where $SAC^+$ hereinbelow is a surface-active cation, AMSAS here and below is an amphoteric surface-active substance;
and/or at least one associate of a dichroic cationic dye with surface-active anion and/or amphoteric surfactant of general formula (III): $(Mi^+O^-Xi^-)_n${Chromogen $n^+$}$SAI$, where n=0-5, $SAI=SAA^-$ and/or AMSAS, where $SAA^-$ hereinbelow is a surface-active anion;
and/or at least one associate of a dichroic cationic dye with surface-active anion and/or amphoteric surfactant of general formula (IV): {Chromogen}$(-Z_i^+RR'R''SAI_j)_n$, where $Z_i$=N, P; R, R', R''=alkyl or substituted alkyl of type $CH_3$, $ClC_2H_4$, $HOC_2H_4$, $C_2H_5$, $C_3H_7$; $SAI_i=SAA^-$, AmSAS, n=1-4;
and/or at least one salt of dichroic anionic oligomeric dye having general formula (V):
$([\{-Chromogen\}(-X_iO^-Mi^+)_n]-L_i-)_q$, where L=$(CH_2)_6$, $C_6H_4$, $C_6H_3G$-$C_6H_3G$, $C_6H_3G$—Q—$C_6H_3G$ where G=H, Hal, OH, $NH_2$, Alk and Q=O, S, NH, $CH_2$, CONH, $SO_2$, NH—CO—NH, CH═CH, N═N, CH═N; n=1-10, q=5-15;
and/or at least one water insoluble dichroic dye and/or pigment without ionogenic or hydrophilic groups;
and the dye can contain both the same ionic groups —$X_iOM_i^+$, —$X_jO^-SAI_j$, —$X_i^+RR'R''$ and/or $M_i^+$, and simultaneously can comprise several different ionic groups and/or $M_i^+$, including the variant of absence of two identical groups and/or cations; ionic groups —$X_iOM_i^+$, —$X_jO^-SAI_j$, —$X_i^+RR'R''$ can be linked directly with aromatic ring and/or through bridge —$Q_i$—$(CH_2)_p$—, where $Q_i$=$SO_2NH$, $SO_2$, CONH, CO, O, S, NH, $CH_2$; p=1-10.

11. The optical device according to claim 10, wherein at least one dye chromogen represents a chromophore system of mono-, bis-, tris-, polyazo- or azoxy-dyes, stylbene, azomethine, polymethine, cyanine, hemicyanine, thiopyronine, pyronine, acridine, anthraquinone, perinone, indigoid, oxazine, arylcarbonium, thiazine, xanthene or azine dyes, heterocyclic derivatives of di- and triarylmethanes, polycyclic or metal complex compounds, heterocyclic derivatives of anthrone.

12. The optical device according to claim 1, further comprising an alignment layer, formed of inorganic and/or different polymeric materials.

13. The optical device according to claim 1, further comprising a light-reflecting layer.

14. The optical device according to claim 1, further comprising a drawing layer.

15. The optical device according to claim 1, wherein at least one molecular oriented layer is formed on a substrate surface.

16. The optical device according to claim 15, wherein the substrate is fulfilled in form of lens of arbitrary curvature.

17. The optical device according to claim 15, wherein the substrate represents a rough absorptive materials selected from paper, Whatman drawing paper, cardboard, nonwoven material, cotton, wool, polyamide, polyester cloth.

18. The optical device according to claim 15, further comprising an adhesive layer, disposed between the substrate and the molecular oriented layer.

19. The optical device in form of a liquid crystal display, comprising a liquid crystal layer disposed between a first and a second plates, at least one of which comprises electrodes and at least one optical device for creation and/or transformation of polarized electromagnetic radiation as claimed in claim 1.

20. The optical device in form of a liquid crystal display according to claim 19, wherein at least one plate is a polymeric film.

21. The optical device in form of a liquid crystal display to claim 19, wherein at least one optical device for creation and/or transformation of polarized electromagnetic radiation is disposed on the internal side of at least one plate.

22. The optical device in form of a liquid crystal display according to claim 19, comprising at least one polarizer, including at least one molecular oriented layer of dichroic material, projection on the plane of said layer of optical transition dipole moment of at least one anisotropically absorbing fragment of dichroic material molecule is substantially perpendicular to optical axis of said layer at least in some wavelengths range of electromagnetic radiation.

23. The optical device in form of a liquid crystal display according to claim 19, further comprising molecular oriented layers of dichroic material transparent in visible spectral wavelengths range, comprising or not at least one molecular oriented layer of dichroic material, comprising at least one anisotropic absorbing fragment, projection on the plane of molecular oriented layer of optical transition dipole moment of above anisotropic absorbing fragment is substantially parallel or perpendicular to optical axis of molecular oriented layer at least in some wavelengths range of electromagnetic radiation.

24. The optical device in form of a liquid crystal display according to claim 19, comprising as at least one polarizer a polarizer based on PVA dyed with iodine compounds and/or dichroic dyes.

25. The optical device in form of a liquid crystal display according to claim 19, further comprising an adhesive layer disposed between the substrate and the molecular oriented layer.

26. The optical device according to claim 1, further comprising at least one optically isotropic layer has a refractive index that coincides with or maximally approaches one of refractive indices of the birefringent anisotropically absorbing layer.

27. The optical device according to claim 1, further comprising at least one birefringent layer, and one refractive index of the birefringent layer coincides with, or maximally approaches one of refractive indices of the birefringent anisotropically absorbing layer, and the second refractive indices of the birefringent layer and birefringent anisotropically absorbing layers differ from one another.

* * * * *